(12) United States Patent
Inoue

(10) Patent No.: US 6,844,902 B2
(45) Date of Patent: Jan. 18, 2005

(54) LIQUID CRYSTAL DISPLAY DEVICE HAVING PAWL PORTIONS AND HINGE MEMBERS

(75) Inventor: Hiromoto Inoue, Kumamoto (JP)

(73) Assignee: Kabushiki Kaisha Advanced Display, Kumamoto (JP)

( * ) Notice: Subject to any disclaimer, the term of this patent is extended or adjusted under 35 U.S.C. 154(b) by 302 days.

(21) Appl. No.: 09/748,137

(22) Filed: Dec. 27, 2000

(65) Prior Publication Data

US 2001/0043293 A1 Nov. 22, 2001

(30) Foreign Application Priority Data

Dec. 27, 1999 (JP) .............................................. 11-368830

(51) Int. Cl.[7] .............................................. G02F 1/1333
(52) U.S. Cl. .............................................. 349/58; 361/60
(58) Field of Search .............................. 349/58; 16/342, 16/223; 361/681, 60

(56) References Cited

U.S. PATENT DOCUMENTS

| | | | | |
|---|---|---|---|---|
| 5,432,626 A | * | 7/1995 | Sasuga et al. ................. | 349/58 |
| 5,467,504 A | * | 11/1995 | Yang ............................. | 16/342 |
| 5,479,285 A | * | 12/1995 | Burke ........................... | 349/58 |
| 5,949,502 A | * | 9/1999 | Matsunaga et al. ........... | 349/40 |
| 5,949,642 A | * | 9/1999 | Park ............................. | 361/681 |
| 6,272,006 B1 | * | 8/2001 | Lee ............................... | 361/681 |
| 6,476,883 B1 | * | 11/2002 | Salimes et al. ................ | 349/58 |

* cited by examiner

Primary Examiner—Robert H. Kim
Assistant Examiner—P. R. Akkapeddi
(74) Attorney, Agent, or Firm—McDermott Will & Emery LLP

(57) ABSTRACT

A liquid crystal display device which can, even in case where a vibration and an impact such as drop are exerted on a note type computer in which the liquid crystal display device is mounted, prevent a fitting portion for fixing a case body and an LCD cover from disengaging and a pawl portion of the fitting portion from being damaged, and which has fixing means whose maintenance performed by detaching the case body and the LCD cover is easy. A frame-like cushion material whose internal dimension is smaller than an external dimension of a liquid crystal display element and which is formed by using a material excellent in its elastic coefficient and having a high friction factor is mounted inside the case body 4 of the liquid crystal display device, and the liquid crystal display element is fitted into the frame.

8 Claims, 9 Drawing Sheets

Fig. 5A
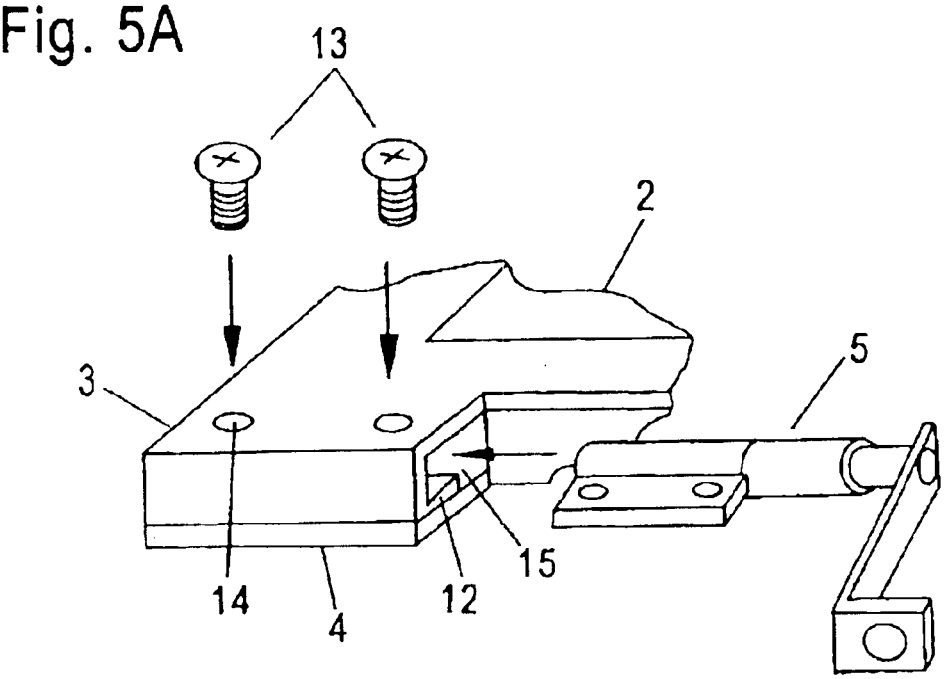
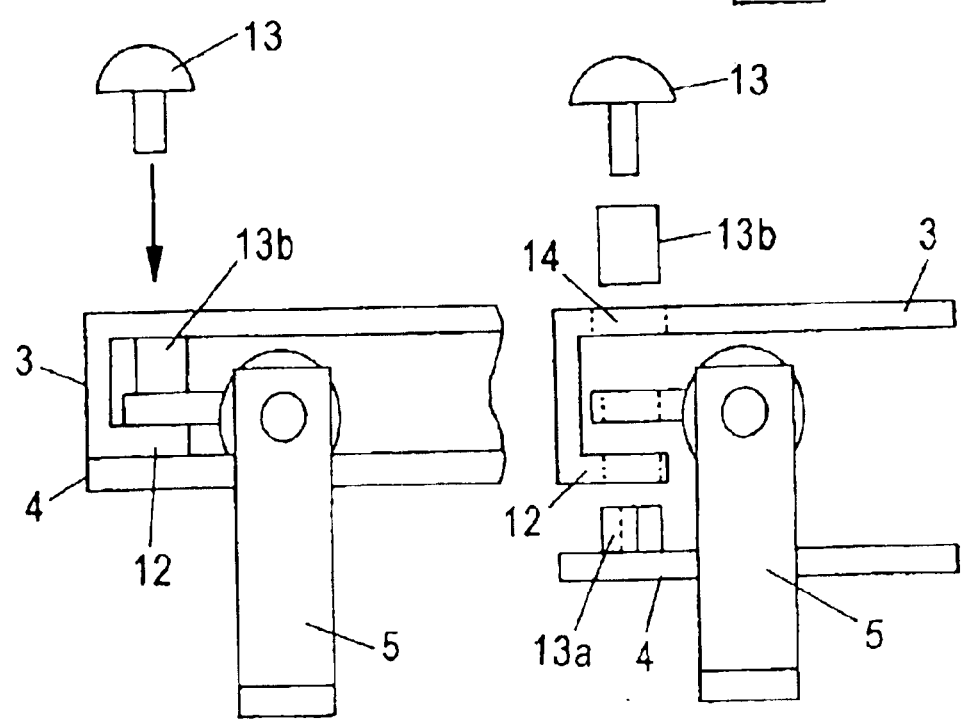
Fig. 5B
Fig. 5C

LIQUID CRYSTAL DISPLAY DEVICE HAVING PAWL PORTIONS AND HINGE MEMBERS

BACKGROUND OF THE INVENTION

1. Field of the Invention

The present invention relates to a liquid crystal display device.

2. Description of the Related Art

The progress in information communication technology and product technology in recent years is remarkable, and computers and Japanese word processors, which have operation throughputs in EWS class of one generation ago and to which large capacity recording devices are added, glut the market, and they are supplied at low prices up to now. Computers of nowadays are classified mainly into a thin and light one, which can be driven by accumulator or battery in order to have a portable function and is convenient for carrying, and a desk top type equivalent to conventional ones.

As to the computer having the portable function, in each company there has been advanced a development laying emphasis on increasing an operation processing speed and on a portable ability, and there have been performed various commodity developments responding to clients' needs from a watch-like small size type fixed by a belt, which is small-sized and light and in which a function in the portable ability is investigated, to an A4 or A5 size note type and a lap top type, in each of which a monitor has been eliminated in order to effectively use a space on a table in an office.

The computers of the note type and the lap top type are epochal products in each of which a peripheral equipment consisting of a magnetic recording device, an input/output functional section consisting of a keyboard and a display section are integrated in a main body, and each of which is integrated so as to be opened/closed by using a mechanism part (hereafter, referred to as hinge) supporting the display section in a rotatable state.

FIGS. 7A and 7B are schematic views showing an external appearance of a conventional note type computer in which a liquid crystal display device is mounted as the display section. FIG. 7A shows a state in which the display section is closed, and FIG. 7B a state in which the display section is opened. FIGS. 8A and 8B are plan views showing the display section (liquid crystal display device) of FIGS. 7A and 7B. FIG. 8A shows a state in which an LCD cover is attached, and FIG. 8B a state in which the LCD cover is detached. FIGS. 9A to 9D are sectional views of portions shown in FIGS. 7A, 7B and FIGS. 8A, 8B. FIG. 9A shows a section taken along a line C—C, FIG. 9B a section taken along a line D—D, FIG. 9C a section taken along a line E—E, and FIG. 9D a section taken along a line F—F.

In the drawings, 1 denotes a liquid crystal display device, i.e., display section of the note type computer, 2 a liquid display element, 3 an LCD cover, 4 a case body of the liquid crystal display device, 5 a hinge, 6 a circuit substrate, 8 a fitting portion between the LCD cover 3 and the case body 4, 8a a fitting pawl portion provided in the LCD cover 3, 8b a fitting pawl portion provided in the case body 4, 13 a bolt, 17 an FPC, and 18 a double-coated tape.

As shown in FIGS. 7A and 7B, in the liquid crystal display device 1, the circuit substrate 6 of the liquid crystal display element 2 and the hinges 5 are accommodated between the case body 4 and the LCD cover 3 and, further, an opening/closing function of the liquid crystal display device 1 is maintained by the hinges 5.

Further, a fixing between the LCD cover 3 and the case body 4 of the liquid crystal display device 1 is performed by mutually fitting the pawl portions 8a and 8b provided in the LCD cover 3 and the case body 4 and, additionally in order to strengthen a fixing between the LCD cover 3 and the case body 4, there are adopted a method in which the fixing is performed by adhering to the double-coated tape 18 and a method in which the LCD cover 3 is fixed to the case body 4 by the bolt 13 through a hole provided in the former.

Since the fixing between the LCD cover 3 and the case body 4 of the liquid crystal display device 1 is performed by the methods mentioned above, there have been such problems that, in case where a vibration and an impact such as drop are exerted on the note type computer in which the liquid crystal display device 1 is mounted, the fitting portion 8 between the LCD cover 3 and the case body 4 is disengaged, so that the liquid crystal display element 2 is injured or the pawl portions 8a and 8b are damaged and, further in case where the double-coated tape 18 is used in order to strengthen the fixing, a workability is reduced by a removal of the double-coated tape 18 when it is necessary to detach the LCD cover 3 from the case body 4 for the purpose of repair and the like and, additionally when the double-coated tape 18 is highly adhesive, the LCD cover 3 is injured, so that it must be exchanged.

Further, as to the method in which the LCD cover 3 is fixed to the case body 4 by the bolt through the hole provided in the former, there have been such problems that a workability at a maintenance time is reduced, and a cost becomes high owing to an increase in the number of members.

Further, accompanying with a demand for miniaturization of the liquid crystal display device, there has been a problem that, by the fact that the liquid crystal display device 1 is designed such that its frame is suitably narrowed, a clearance between the liquid crystal display element 2 and the case body 4 is decreased as shown in FIG. 9C, so that it is difficult to fit the LCD cover 3 to the case body 4.

SUMMARY OF THE INVENTION

The invention has been made in order to solve such problems as mentioned above, and its object is to provide a liquid crystal display device which can, even in case where the vibration and the impact such as drop are exerted on a note type computer in which the liquid crystal display device is mounted, prevent a fitting portion for fixing the case body and the LCD cover from disengaging and a pawl portion of the fitting portion from being damaged, which has fixing means whose maintenance performed by detaching the case body and the LCD cover is easy, and which can cope with narrowing the frame of the liquid crystal display device.

The invention provides a liquid crystal display device comprising: a liquid crystal display element in which a liquid crystal material is interposed between two opposed insulating substrates; a case body disposed on a back side of the liquid crystal display element and supporting the liquid crystal display element; an LCD cover disposed in a display surface side of the liquid crystal display element, having an opening portion in a display region, and accommodating the liquid crystal display element by integrating with the case body through a fitting portion; and a cushion material arranged in the case body in a frame-like form and holding the liquid crystal display element by fitting it into the frame; wherein the cushion material is constituted such that the fitting portion between the case body and the LCD cover is pressed by the fact that the liquid crystal display element is fitted into the cushion material, thereby strengthening the fitting.

Further, the invention provides a liquid crystal display device wherein, in the above constitution, the cushion material is formed by using a material excellent in its elastic coefficient and having a high friction factor.

Further, the invention provides a liquid crystal display device comprising: a liquid crystal display element in which a liquid crystal material is interposed between two opposed insulating substrates; a case body disposed in a back side of the liquid crystal display element and supporting the liquid crystal display element; an LCD cover disposed in a display surface side of the liquid crystal display element, having an opening portion in a display region, and accommodating the liquid crystal display element by integrating with the case body through a fitting portion; mechanism parts (hinges) fixed to the case body and supporting the case body accommodating the liquid crystal display element and integrated therewith and the LCD cover in a rotatable state; and pawl portions provided in the LCD cover and capable of engaging with the hinges.

Further, the invention provides a liquid crystal display device comprising: a liquid crystal display element in which a liquid crystal material is interposed between two opposed insulating substrates; a case body disposed in a back side of the liquid crystal display element and supporting the liquid crystal display element; an LCD cover disposed in a display surface side of the liquid crystal display element, having an opening portion in a display region, and accommodating the liquid crystal display element by integrating with the case body through a fitting portion; mechanism parts (hinges) supporting the case body accommodating the liquid crystal display element and integrated therewith and the LCD cover in a rotatable state; and pawl portions provided in the LCD cover in portions where the hinges are mounted, and fixed to the case body together with the hinges by a bolt and the like.

Further, the invention provides a liquid crystal display device wherein, in the above constitution, the LCD cover and the case body are constituted such that the hinge can be mounted after the LCD cover and the case body have been integrated.

BRIEF DESCRIPTION OF THE DRAWINGS

FIG. 5A is a perspective view showing the liquid crystal display device according to an Embodiment 3 of the invention;

FIG. 5B is a sectional view showing the same;

FIG. 5C is an exploded sectional view showing the same;

DETAILED DESCRIPTION OF THE PREFERRED EMBODIMENTS

Embodiment 1

Figure 1A:
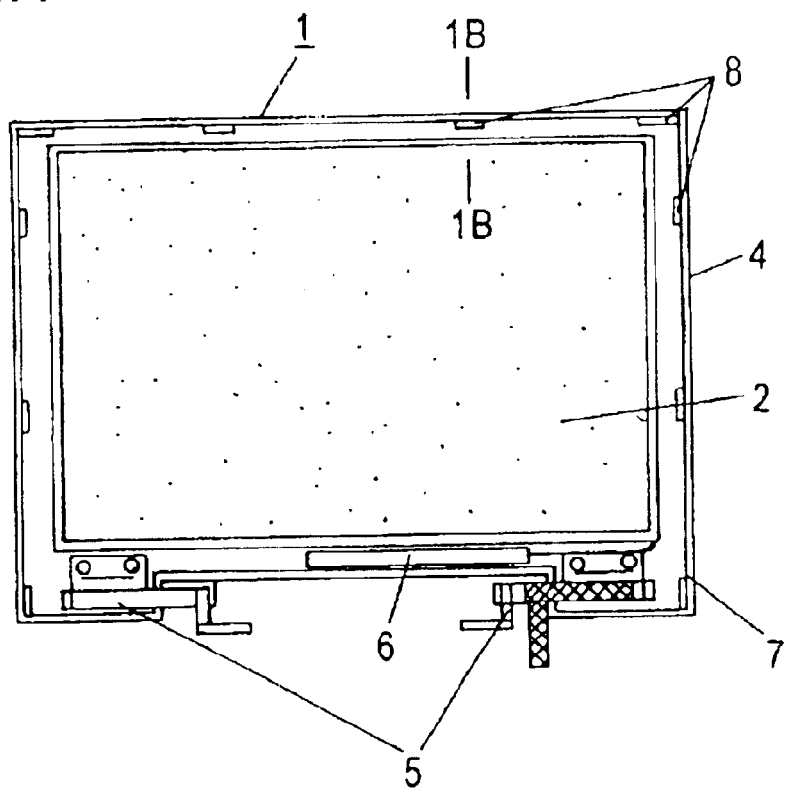
FIG. 1A is a plan view showing a liquid crystal display device according to an Embodiment 1 of the invention.
Figure 1B:
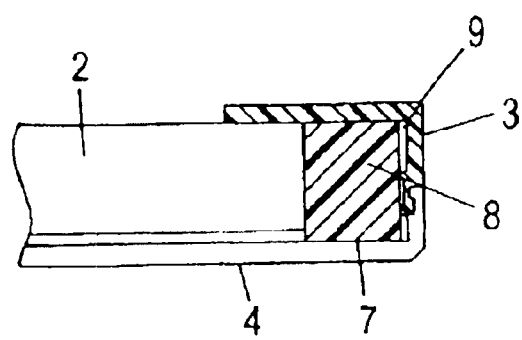
FIG. 1B is a sectional view showing the same.
Figure 1C:
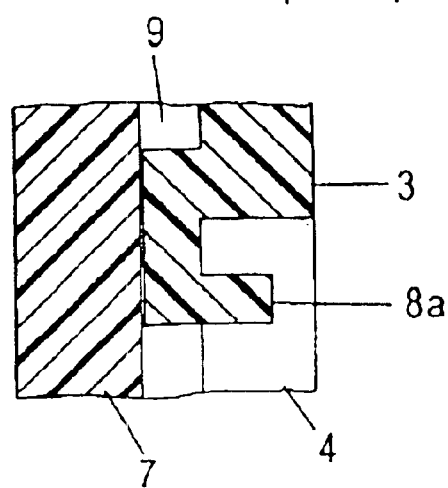
FIG. 1C is a partial enlarged sectional view showing the same.

Hereunder, it is explained about a liquid crystal display device which is one embodiment of the invention. FIGS. 1A to 1C are views showing a liquid crystal display device according to an Embodiment 1 of the invention. FIG. 1A is plan view of a state in which an LCD cover is detached, FIG. 1B a sectional view taken along a line A—A in FIG. 1A, and FIG. 1C an enlarged sectional view of a fitting portion in FIG. 1B. Incidentally, in FIG. 1B, for convenience' sake there is shown a state in which the LCD cover is mounted.

In the drawings, 1 denotes a liquid crystal display device, i.e., display section of a note type computer, 2 a liquid crystal display element, 3 an LCD cover, 4 a case body of the liquid crystal display device, 5 a hinge, 6 a circuit substrate, 7 a cushion material, 8 a fitting portion between the LCD cover 3 and the case body 4, 8a a fitting pawl portion provided in the LCD cover 3, and 9 a groove portion provided in the cushion material 7.

In the liquid crystal display device of this embodiment, since the frame-like cushion material 7 capable of accommodating the liquid crystal display element 2 is mounted inside the case body 4, and since it is designed such that an internal dimension of a frame by the cushion material 7 becomes smaller than an external dimension of the liquid crystal display element 2, by fitting the liquid crystal display element 2 into the frame formed by the cushion material 7, the cushion material 7 applies an even pressure to the case body 4 and the liquid crystal display element 2 is held by the cushion material 7.

Incidentally, the cushion material 7 is provided in its portion corresponding to the fitting portion 8 between the LCD cover 3 and the case body 4 with the groove portion 9 and, when mounting the LCD cover 3 on the case body 4, the LCD cover 3 and the case body 4 are integrated by inserting the pawl portion 8a of the LCD cover 3 into the groove portion 9.

Further, in this embodiment, a rubber material is used as a material of the cushion material 7, and there are obtained two effects of a buffer effect for the liquid crystal display element 2 by fitting the liquid crystal display element 2 into the cushion material 7 in which the internal dimension of the frame is designed so as to be smaller than the external dimension of the liquid crystal display element 2, and of a fitting reinforcement between the case body 4 and the LCD cover 3 owing to an oppression of the cushion material 7 against the fitting portion 8 by the fact that the liquid crystal display element 2 is fitted, and owing to an increase in frictional force between the cushion material 7 and the fitting portion 8. However, equivalent effects can be obtained also by using a material excellent in its elastic coefficient and having a high friction factor, for example, plastic resin such as epoxy group or ethyl acetate group, and thick vinyl tape.

Further, as to a size of the cushion material 7, it is set such that, in case where an external dimension of the liquid crystal display element 2 is 277 mm×198 mm for instance, the internal dimension of the frame of the cushion material 7 is 275 mm×196 mm, and thus a reduced width with respect to the external dimension of the liquid crystal display element is 2 mm respectively in longitudinal and lateral directions.

Incidentally, the cushion material 7 is used for the purpose of holding the liquid crystal display element 2 and pressing the fitting portion 8, and the reduced width of the internal dimension of the frame by the cushion material 7 with respect to the external dimension of the liquid crystal display element may be made in the order of 1 mm respectively in longitudinal and lateral directions.

Figure 2A:
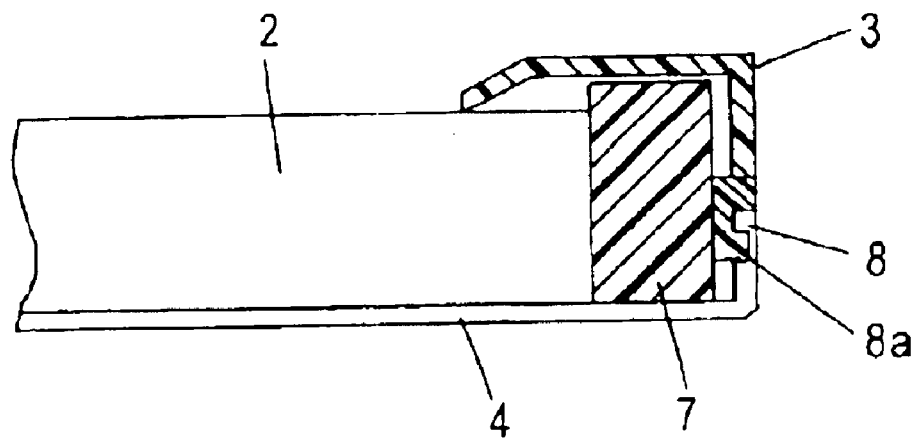
FIGS. 2A and 2B are sectional views showing another liquid crystal display device according to the Embodiment 1 of the invention.

Further, although a thickness of the cushion material 7 may be equivalent to the liquid crystal display element 2, or thinner or thicker than it, in case where it is made thicker than the liquid crystal display element 2, since a gap is generated between the LCD cover 3 and the liquid crystal display element 2, by causing the LCD cover 3 to have a structure capable of dealing with a step between the cushion material 7 and the liquid crystal display element 2 as shown in FIG. 2A, it is possible to intend to improve the buffer effect against a pressure and the impact from the outside.

Figure 2B:
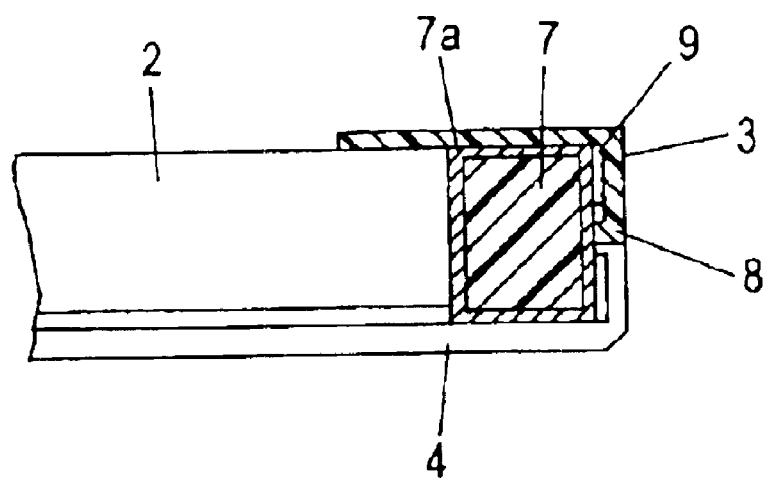

Further, as shown in FIG. 2B, by covering the cushion material 7 with a mesh-like material 7a consisting of a metal material, it is possible to electrically connect the liquid crystal display element 2 and the case body 4 through the mesh-like material 7a, so that a reliability of the liquid crystal display element 2 can be improved.

Further, although the cushion material 7 having a rectangular shape in its sectional shape has been used, even if there is used one whose sectional shape is an approximately U-shape and whose inside is hollow for the purpose of lightening the liquid crystal display device or one whose side contacting with the liquid crystal display element 2 is made a semicircular shape, an effect as the cushion material 7 is equivalent.

Figure 3A:
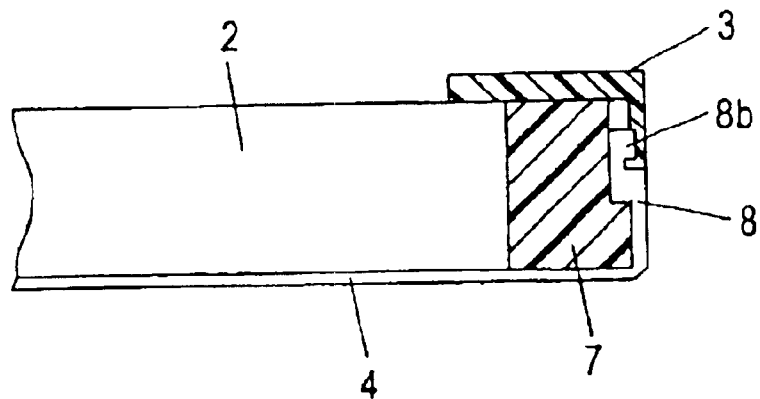
FIGS. 3A and 3B are sectional views showing still another liquid crystal display device according to the Embodiment 1 of the invention.

Further, the LCD cover 3 and the case body 4 may be fixed by adopting a shape of the fitting portion 8 between the LCD cover 3 and the case body 4 such that, as shown in FIG. 3A, a pawl portion 8b is provided in a case body 4 side and it is fitted into a groove provided in an LCD cover 3 side.

Figure 3B:
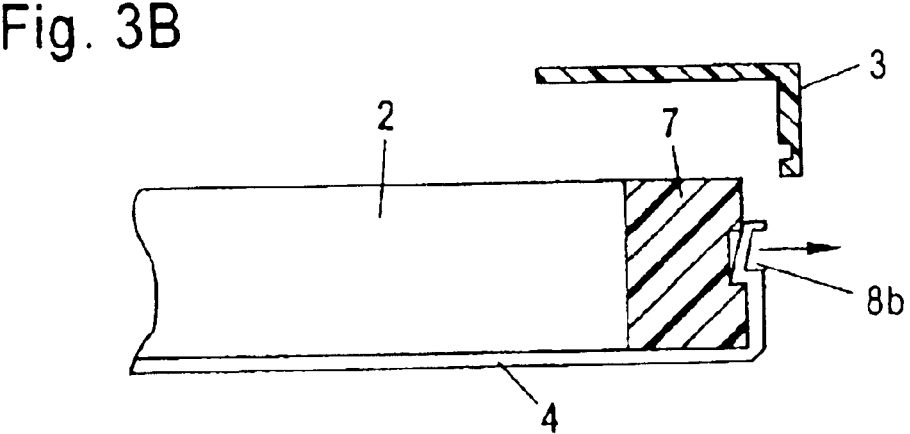

Additionally, as shown in FIG. 3B, it is also possible to strengthen the fitting between the LCD cover 3 and the case body 4 by adopting such a structure that the fitting pawl portion 8b provided in the case body 4 is opened outward by a pressure owing to the fact that the liquid crystal display element 2 is mounted in the cushion material 7.

Figure 3C:
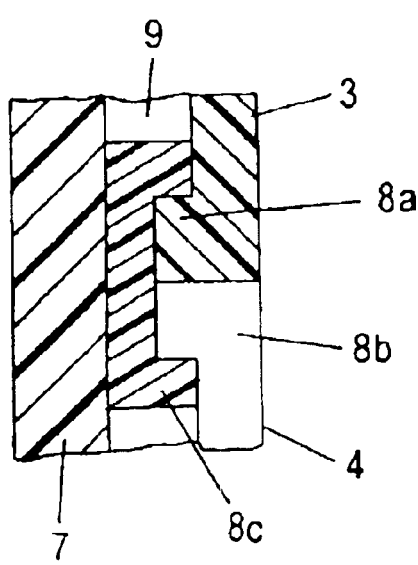
FIG. 3C is a partial enlarged sectional view showing the same.

Further, not by directly fitting the pawl portion 8a of the LCD cover 3 and the pawl portion 8b of the case body 4, but by fixing the pawl portions 8a and 8b by means of using a block 8c or the like as shown in FIG. 3c, it may be intended to strengthen the fixed portion by pressing the cushion material 7.

According to this embodiment, by mounting, inside the case body 4 of the liquid crystal display device 1, the frame-like cushion material 7 designed such that its internal dimension is smaller than the external dimension of the liquid crystal display element 2 and formed using the material excellent in its elastic coefficient and having a high friction factor, and by fitting the liquid crystal display element 2 into the frame, even in case where the vibration and the impact such as drop are exerted on the liquid crystal display device 1, it is possible to strengthen the fitting between the case body 4 and the LCD cover 3 and buffer the impact exerted on the liquid crystal display element 2, by the fact that the cushion material 7 presses the fitting portion 8 and thus a frictional force between the cushion material 7 and the fitting portion 8 is increased.

Further, since the case body 4 and the LCD cover 3 are fixed only by the fitting, a screw and the like, which have been hitherto necessary, for strengthening the fixing between the case body and the LCD cover become unnecessary, so that the number of members can be decreased and a maintenance performed by detaching the case body 4 and the LCD cover 3 becomes easy.

Additionally, in the case body 4, since the liquid crystal display element 2 is held by the cushion material 7 owing to its elasticity, the blanket, the screw and the like, which have been hitherto necessary, for holding the liquid crystal display element 2 become unnecessary.

Embodiment 2

Figure 4A:
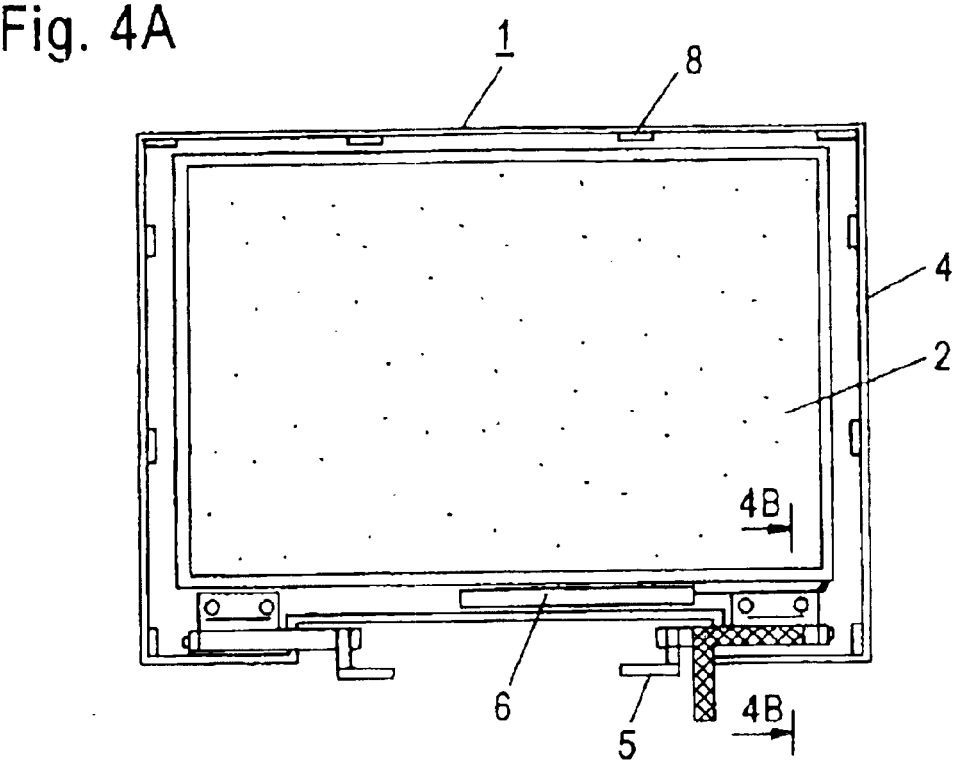
FIG. 4A is a plan view showing the liquid crystal display device according to an Embodiment 2 of the invention.
Figure 4B:
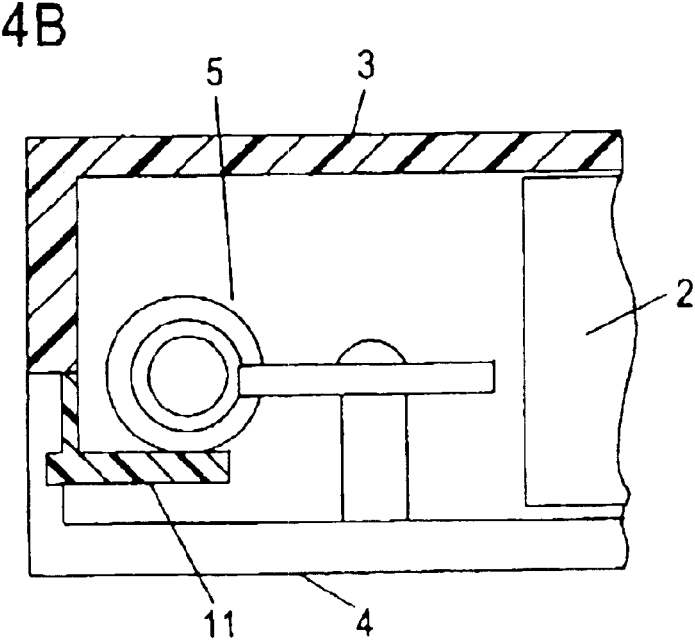
FIG. 4B is a sectional view showing the same.

FIGS. 4A and 4B are views showing the liquid crystal display device according to an Embodiment 2 of the invention. FIG. 4A is a plan view of a state in which the LCD cover is detached, and FIG. 4B a side view in which a section taken along a line B—B in FIG. 4A is seen from an arrow mark direction. Incidentally, in FIG. 4B, for convenience's sake there is shown a state in which the LCD cover is mounted.

In the drawings, 11 denotes a pawl portion provided in the LCD cover 3. Incidentally, as to the same portion as FIGS. 1A to 1C, the same reference numeral is affixed thereto, and its explanation is omitted.

In the liquid crystal display device according to this embodiment, besides fitting portion 8, similar to conventional one, between the LCD cover 3 and the case body 4, the pawl portion 11 designed so as to be capable of being extended to a back side (case body 4 side) of the hinge 5 is provided in a position corresponding to a portion where the hinge 5 is attached to the case body 4 of the LCD cover 3.

According to this embodiment, by providing the LCD cover 3 with the pawl portion 11 capable of being extended to the back side of the hinge 5, the LCD cover 3 can be engaged with the hinge 5 fixed to the case body 4 by using the pawl portion 11, so that it is possible to strengthen a fixing between the LCD cover 3 and the case body 4. Additionally, a method of strengthening the fixing between the LCD cover 3 and the case body 4 by the above structure can be applied also to the liquid crystal display device whose frame has been narrowed.

Embodiment 3

FIGS. 5A to 5C are views showing the liquid crystal display device according to an Embodiment 3 of the invention. FIG. 5A is a perspective view midway of an assembling process of the liquid crystal display device, FIG. 5B a sectional view midway of the assembling process of the liquid crystal display device, and FIG. 5C an exploded sectional view for explaining a constitution of the liquid crystal display device.

In the drawings, 12 denotes an L-shape pawl portion provided in the LCD cover 3, and 13 a bolt. 13a denotes a cylindrical protrusion portion provided inside the case body 4, and in its inside there is threaded a screw meshing with the bolt 13. 13b denote a spacer, 14 a hole portion provided in, the LCD cover 3 through which the bolt 13 is inserted, and 15 an opening portion for inserting the hinge 5 after the LCD cover 3 has been mounted on the case body 4, Incidentally, as to the same portion as FIGS. 4A and 4B, the same reference numeral is affixed thereto, and its explanation is omitted.

In the liquid crystal display device according to this embodiment, the L-shape pawl portion 12 is provided in a portion, of the LCD cover 3, where the hinge 5 is attached, the hinge 5 is inserted from the opening portion 15 after the LCD cover 3 has been mounted on the case body 4, and the bolts 13 are inserted from the hole portions 14 provided in the LCD cover 3, thereby simultaneously fixing the LCD cover 3, the hinge 5 and case body 4. On this occasion, as shown in FIG. 5B, a sectional structure of a fixing portion by the bolts 13 becomes a state in which the case body 4, the L-shape pawl portion 12 of the LCD cover 3, the hinge 5 and the LCD cover 3 have been superposed in this order from a back side of a display screen.

Incidentally, since the hinge 5 is inserted after the LCD cover 3 has been mounted on the case body 4, the case body 4 is provided with a frame such that the hinge 5 can be easily mounted in a predetermined position.

Further, the case body 4 is provided with the cylindrical protrusion portion 13a in which the screw has been threaded, the L-shape pawl portion 12 and the hinge 5 are fitted with the protrusion portion 13a, the hinge 5 is fixed to the L-shape pawl portion 12 of the LCD cover 3 by the spacer 13b, and the bolt 13 is meshed with the cylindrical protrusion portion 13a, thereby simultaneously fixing the hinge 5 and the LCD cover 3 to the case body 4.

Further, in this embodiment, as a material constituting the case body 4 and the LCD cover 3, there has been used a resin molded article consisting of a plastic such as polycarbonate, but it is possible to intend a buffer and a fitting strengthening by using a high polymer material excellent in its elastic coefficient. Further, by using a metal material, a looseness, owing to strain, of the fitting portion by the impact can be prevented, so that it is possible to intend the fitting strengthening.

Figure 6:
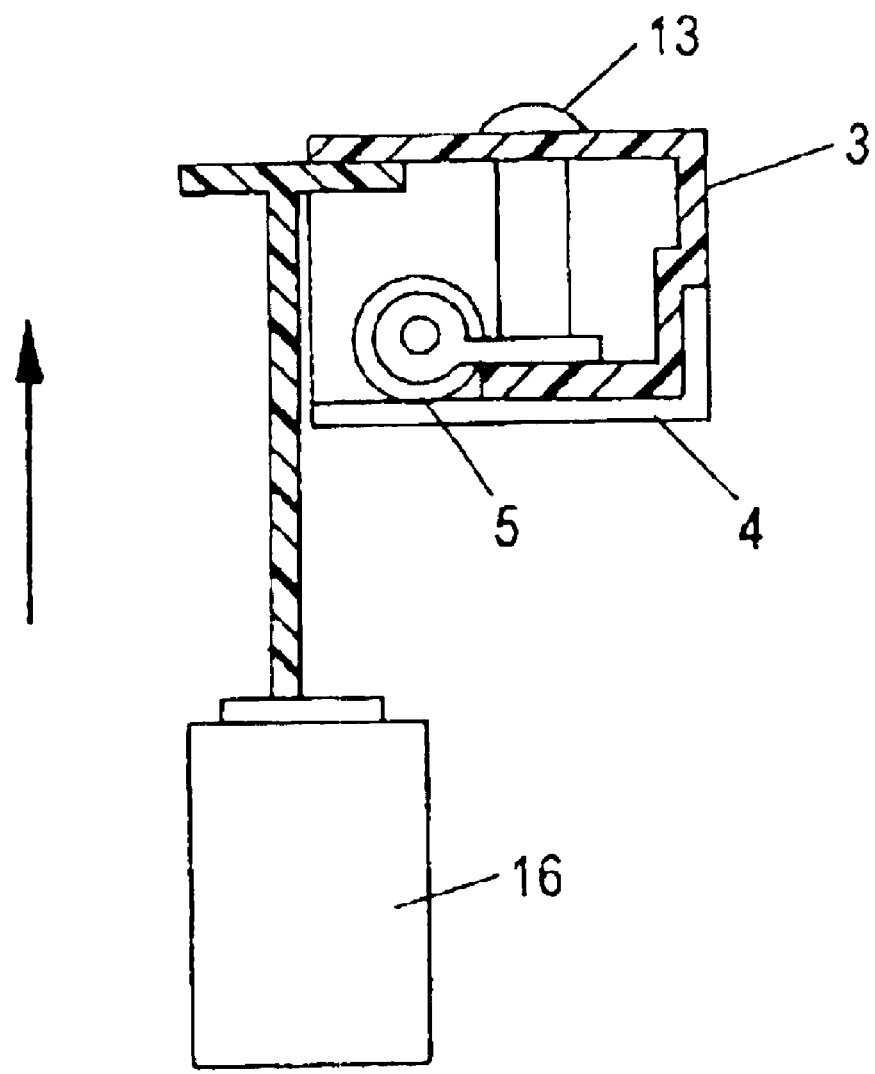
FIG. 6 is a sectional view for explaining a method of measuring an effect by the invention.
Figure 7A:
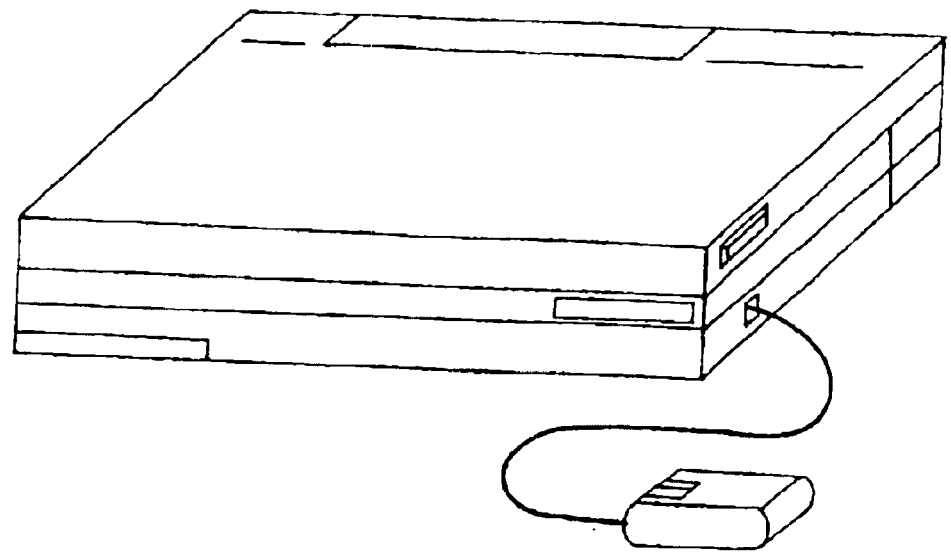
FIGS. 7A and 7B are schematic views showing a note type computer in which a conventional liquid crystal display device of this kind is mounted.
Figure 7B:
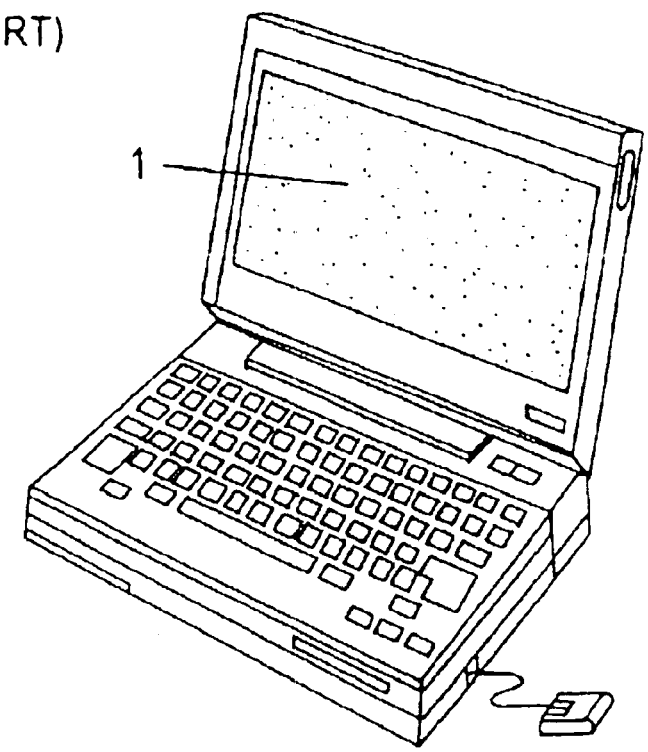
Figure 8A:
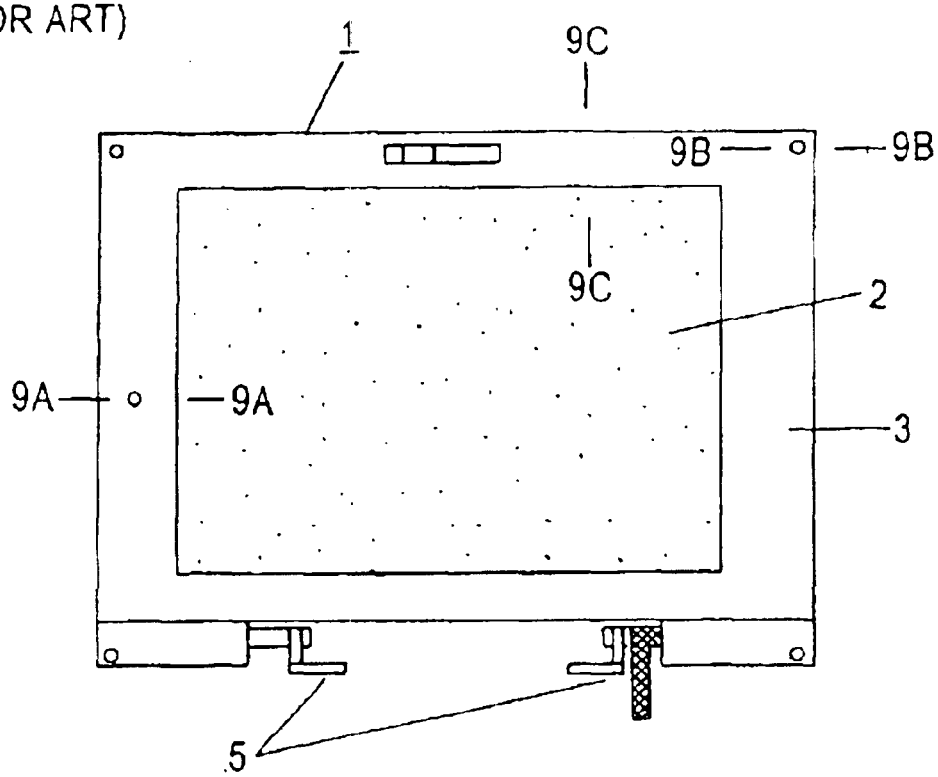
FIGS. 8A and 8B are plan views showing the conventional liquid crystal display device.
Figure 8B:
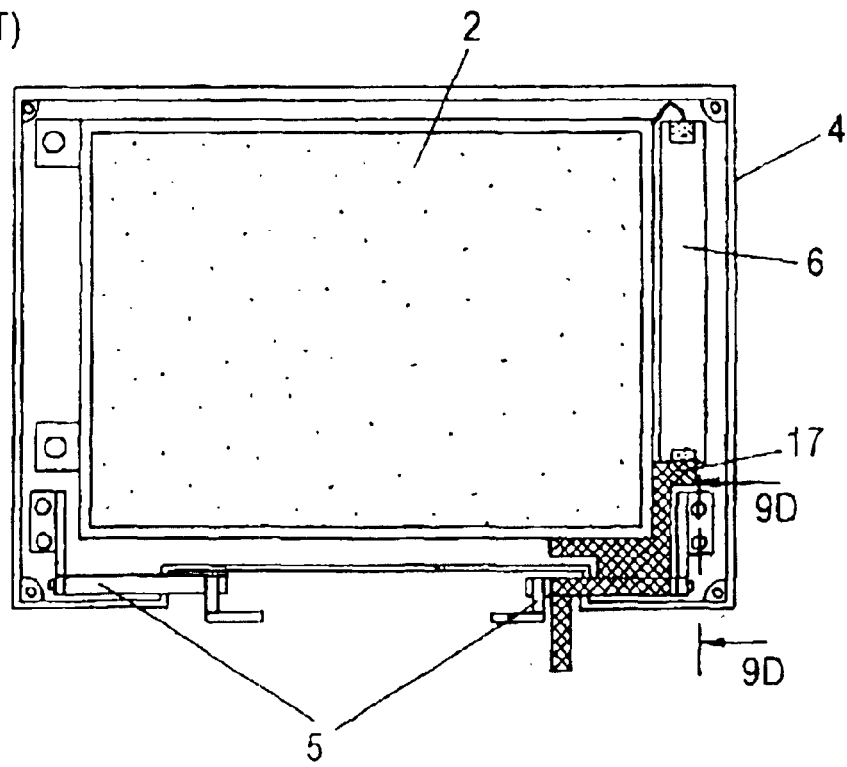
Figure 9A:
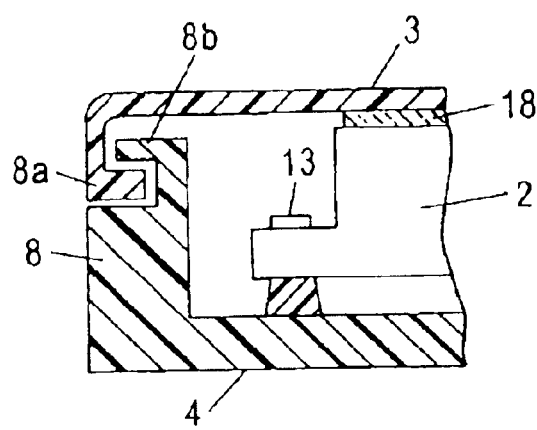
FIGS. 9A to 9D are sectional views showing the conventional liquid crystal display device.
Figure 9B:
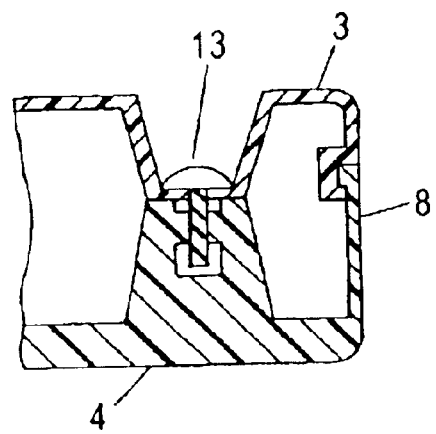
Figure 9D:
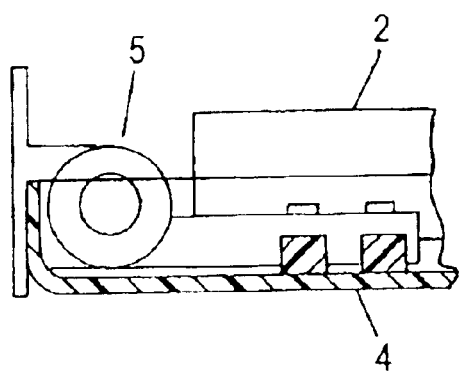
Figure 9C:
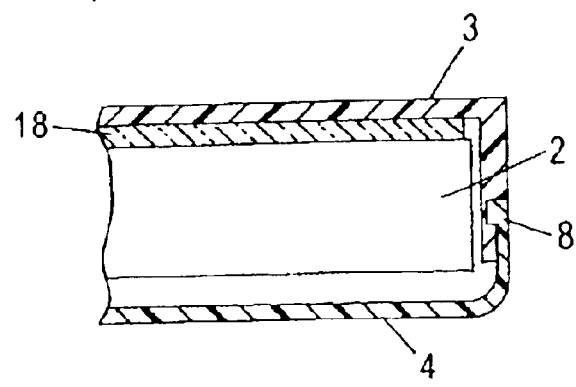

Next, a fixing strength between the LCD cover 3 and the case body 4 of the liquid crystal display device 1 of this embodiment is measured. As shown in FIG. 6, in a measuring method, by using a push-pull gauge 16, a pressure was applied until a fixing portion between the LCD cover 3 and the case body 4 was broken. In the liquid crystal display device 1 according to this embodiment, it was necessary to apply the pressure of 10–15 kg weight until the fixing portion between the LCD cover 3 and the case body 4 was broken.

For comparison, when the pressure was applied in a similar method to the conventional liquid crystal display device in which the LCD cover and the case body was not fixed by the double-coated tape, it was broken by applying the pressure of 5 kg weight.

According to this embodiment, by providing the L-shape pawl portion 12 in the portion, of the LCD cover 3, where the hinge 5 is attached, inserting the hinge 5 from the opening portion 15 after the LCD cover 3 has been mounted on the case body 4, and inserting the bolts 13 from the hole portions 14 provided in the LCD cover 3 to thereby simultaneously fix the LCD cover 3, the hinge 5 and the case body 4, it is possible to strengthen the fixing between the case body 4 and the LCD cover 3, and simultaneously; perform the fixing strengthening between the case body 4 and the LCD cover 3 and the fixing of the hinge 5, so that the members can be reduced.

Additionally, by unscrewing the bolts 13, since it becomes possible to detach only the hinge 5, it is possible to prevent beforehand a trouble to an opening/closing function, which results from a deterioration of the hinge 5 and which has hitherto been a problem, and an adverse effect on the liquid crystal element owing to minute vibrations and noises occurring at an opening/closing time.

As mentioned above, according to the invention, by mounting, inside the case body of the liquid crystal display device, the frame-like cushion material whose internal dimension is smaller than the external dimension of the liquid crystal display element and which is formed using the material excellent in its elastic coefficient and having a high friction factor, and by fitting the liquid crystal display element into the frame, even in case where the vibration and the impact such as drop are exerted on the liquid crystal display device, it is possible to prevent the integrated case body and LCD cover from being broken, and buffer the impact exerted on the liquid crystal display element.

Further, since the case body and the LCD cover are fixed only by the fitting, a screw and the like, which have been hitherto necessary, for strengthening the fixing between the case body and the LCD cover become unnecessary, so that the number of members can be decreased and a maintenance performed by detaching the case body and the LCD cover becomes easy.

Additionally, in the case body, since the liquid crystal display element is held by the cushion material owing to its elasticity, the blanket and the screw, which have been hitherto necessary, for holding the liquid crystal display element become unnecessary, so that a cost can be reduced by the decease in the number of members.

Further, by providing the LCD cover, in a portion to which the hinge that is an opening/closing mechanism of the liquid crystal display device is attached, with the pawl portion capable of being extended to the back side of the hinge, the LCD cover can be engaged with the hinge fixed to the case body by using the pawl portion, so that it is possible to strengthen the fixing between the LCD cover and the case body.

Additionally, since a structure in which the LCD cover is provided with the pawl portion capable of being extended to the back side of the hinge and the pawl portion is engaged with the hinge can be applied also to the liquid crystal display device designed such that its frame is narrowed, it is possible to easily strengthen the fixing between the LCD cover and the case body also in the liquid crystal display device designed such that its frame is narrowed.

Further, by providing the LCD cover, in the portion to which the hinge that is the opening/closing mechanism of the liquid crystal display device is attached, with the L-shape pawl portion, disposing the hinge in a predetermined position after the LCD cover has been mounted on the case body, and simultaneously fixing the hinge cover and the pawl portion of the LCD cover to the body case by the bolt and the like from an outside of the LCD cover, it is possible to strengthen the fixing between the LCD cover, the case body and the LCD cover, and simultaneously perform the fixing between the case body and the hinge, so that the members can be decreased.

Additionally, by unscrewing the bolts, since it becomes possible to detach only the hinge, a maintenance of the hinge becomes easy.

What is claimed is:

1. A liquid crystal display device comprising:
   a liquid crystal display element, with a front main surface and a back main surface, in which a liquid crystal material is interposed between two opposed insulating substrates;
   a case body opposing to the back main surface of the liquid crystal display element and supporting the liquid crystal display element;
   an LCD cover opposing to an outer portion of the front main surface of the liquid crystal display element and accommodating the liquid crystal display element by combining with the case body through a fitting portion;

hinge members fixed to the case body and supporting the case body and the LCD cover combined with the case body in a rotational state; and pawl portions provided in the LCD cover and extending to a space between the case body and the hinge members to engage with the hinge members.

2. A liquid crystal display device comprising:

a liquid crystal display element, with a front main surface and a back main surface, in which a liquid crystal material is interposed between two opposed insulating substrates;

a case body opposing to the back main surface of the liquid crystal display element and supporting the liquid crystal display element;

an LCD cover opposing to an outer portion of the front main surface of the liquid crystal display element and accommodating the liquid crystal display element by combining with the case body through a fitting portion;

a hinge member supporting the case body and the LCD cover combined with the case body in a rotational state; and pawl portions provided in the LCD cover in portions where the hinge member is mounted, and fixed to the case body together with the hinge member by bolt means.

3. The liquid crystal display device set forth in claim 2, wherein the LCD cover and case body are constituted such that the hinge member can be mounted after the LCD cover and the case body have been combined.

4. The liquid crystal display device set forth in claim 2, wherein the hinge member and the pawl portion of the LCD cover are fixed between the case body and a spacer.

5. The liquid crystal display device set forth in claim 4, wherein a protrusion portion is provided on the case body, the pawl portion and the hinge member fitted with the protrusion portion, and the bolt means is inserted through the spacer and screwed into the protrusion portion.

6. The liquid crystal display device set forth in claim 1, further comprising:

a cushion material of frame-like form mounted inside the fitting portion between the case body and the LCD cover and having an inner surface surrounding an outside edge of the liquid crystal display element and holding the liquid crystal display element by fitting it into the frame-like form of the cushion material, in which the cushion material has an outer surface opposing to the fitting portion, wherein the LCD cover is integrated with the case body by fitting the liquid crystal display element into the cushion material and the cushion material is constituted such that the fitting portion between the case body and the LCD cover is pressed by the fact that the liquid crystal display element is fitted into the cushion material and presses the cushion material against the fitting portion, thereby strengthening the fitting of the fitting portion between the case body and the LCD cover.

7. The liquid crystal display device set forth in claim 2, further comprising:

a cushion material of frame-like form mounted inside the fitting portion between the case body and the LCD cover and having an inner surface surrounding an outside edge of the liquid crystal display element and holding the liquid crystal display element by fitting it into the frame-like form of the cushion material, in which the cushion material has an outer surface opposing to the fitting portion, wherein the LCD cover is integrated with the case body by fitting the liquid crystal display element into the cushion material and the cushion material is constituted such that the fitting portion between the case body and the LCD cover is pressed by the fact that the liquid display element is fitted into the cushion material and presses the cushion material against the fitting portion, thereby strengthening the fitting of the fitting portion between the case body and the LCD cover.

8. The liquid crystal display device as set forth in claim 7, wherein the cushion material is formed by using a material excellent in its elastic coefficient and having a high friction factor.

* * * * *